United States Patent
Bao et al.

(10) Patent No.: US 10,969,984 B2
(45) Date of Patent: Apr. 6, 2021

(54) MAINTAINING A DNS STORE FOR CONTROL PLANE RESTART OR FAILOVER

(71) Applicant: Juniper Networks, Inc., Sunnyvale, CA (US)

(72) Inventors: Zhijun Bao, Beijing (CN); Yuping Li, Beijing (CN); Yuan Tao, Beijing (CN)

(73) Assignee: Juniper Networks, Inc., Sunnyvale, CA (US)

(*) Notice: Subject to any disclaimer, the term of this patent is extended or adjusted under 35 U.S.C. 154(b) by 71 days.

(21) Appl. No.: 16/367,054

(22) Filed: Mar. 27, 2019

(65) Prior Publication Data

US 2020/0310670 A1  Oct. 1, 2020

(30) Foreign Application Priority Data

Mar. 27, 2019  (CN) .......................... 201910235407.5

(51) Int. Cl.
*H04L 29/12* (2006.01)
*G06F 3/06* (2006.01)

(52) U.S. Cl.
CPC .......... *G06F 3/0647* (2013.01); *G06F 3/0604* (2013.01); *G06F 3/0673* (2013.01); *H04L 61/1511* (2013.01); *H04L 61/6059* (2013.01)

(58) Field of Classification Search
CPC .... G06F 3/0647; G06F 3/0604; G06F 3/0673; H04L 61/1511; H04L 61/6059
See application file for complete search history.

(56) References Cited

U.S. PATENT DOCUMENTS

| | | | |
|---|---|---|---|
| 2008/0228899 | A1 | 9/2008 | Plamondon |
| 2008/0229137 | A1 | 9/2008 | Samuels et al. |
| 2015/0058488 | A1 | 2/2015 | Backholm |
| 2016/0164826 | A1* | 6/2016 | Riedel ................. H04L 61/1511 709/223 |
| 2019/0253274 | A1* | 8/2019 | Van Dussen ............ H04L 43/12 |

* cited by examiner

*Primary Examiner* — Sm A Rahman
(74) *Attorney, Agent, or Firm* — Harrity & Harrity, LLP (57) ABSTRACT

A network device may store domain name system (DNS) information in a DNS file in a first DNS store of a first control plane component included in the network device, the DNS information being associated with a plurality of DNS entries stored in a first DNS memory of the first control plane component; may transfer, based on storing the DNS information in the DNS file in the first DNS store, a copy of the DNS file from the first DNS store to a second DNS store of a second control plane component included in the network device, the copy of the DNS file including the DNS information associated with the plurality of DNS entries; and may transfer, based on detecting an event associated with the first control plane component, the DNS information from the copy of the DNS file to a second DNS memory of the second control plane component.

20 Claims, 7 Drawing Sheets

MAINTAINING A DNS STORE FOR CONTROL PLANE RESTART OR FAILOVER

RELATED APPLICATION

This application claims priority under 35 U.S.C. § 119 to Chinese Patent Application No. 201910235407.5, filed on Mar. 27, 2019, the content of which is incorporated by reference herein in its entirety.

BACKGROUND

The domain name system (DNS) is a hierarchical and decentralized naming system for devices, services, and/or other resources connected to the Internet and/or private networks. The DNS provides a means for resolving domain names to addresses (e.g., Internet protocol (IP) addresses, port identifiers, and/or the like) for locating and identifying devices, services, and/or other resources connected to the Internet and/or private networks.

SUMMARY

According to some implementations, a network device may include one or more memories and one or more processors to store domain name system (DNS) information in a DNS file in a first DNS store of a first control plane component included in the network device, wherein the DNS information is associated with a plurality of DNS entries stored in a first DNS memory of the first control plane component; transfer, based on storing the DNS information in the DNS file in the first DNS store, a copy of the DNS file from the first DNS store to a second DNS store of a second control plane component included in the network device, wherein the copy of the DNS file includes the DNS information associated with the plurality of DNS entries; and transfer, based on detecting an event associated with the first control plane component, the DNS information from the copy of the DNS file to a second DNS memory of the second control plane component.

According to some implementations, a non-transitory computer-readable medium may store one or more instructions. The one or more instructions, when executed by one or more processors of a network device, may cause the one or more processors to store DNS information in a DNS file in a first DNS store of a first control plane component included in the network device, wherein the DNS information is associated with a plurality of DNS entries stored in a first DNS memory of the first control plane component; transfer, based on storing the DNS information in the DNS file in the first DNS store, a copy of the DNS file from the first DNS store to a second DNS store of a second control plane component included in the network device, wherein the copy of the DNS file includes the DNS information associated with the plurality of DNS entries; detect, after transferring the copy of the DNS file to the second DNS store, an event associated with the first control plane component; and transfer, based on detecting the event, the DNS information from the copy of the DNS file to a second DNS memory of the second control plane component.

According to some implementations, a method may include storing, by a network device, DNS information in a DNS file in a first DNS store of a first control plane component included in the network device, wherein the DNS information is associated with a plurality of DNS entries stored in a first DNS memory of the first control plane component; transferring, by the network device and based on storing the DNS information in the DNS file in the first DNS store, a copy of the DNS file from the first DNS store to a second DNS store of a second control plane component included in the network device, wherein the copy of the DNS file includes the DNS information associated with the plurality of DNS entries; detecting, by the network device and after transferring the copy of the DNS file to the second DNS store, an event associated with the first control plane component; transferring, by the network device and based on detecting the event, the DNS information from the copy of the DNS file to a second DNS memory of the second control plane component; and processing, by the network device and using the copy of the DNS file stored in the second DNS memory, traffic received at the network device.

DETAILED DESCRIPTION

The following detailed description of example implementations refers to the accompanying drawings. The same reference numbers in different drawings may identify the same or similar elements.

A domain name system (DNS) server may provide a translation service between domain names and addresses (e.g., Internet protocol (IP) addresses, port identifiers, and/or the like). The DNS server may store DNS information, which may include information identifying a plurality of DNS entries. A DNS entry may include information identifying a domain name and an association between the domain name and one or more IP addresses, information identifying a time to live (TTL) parameter associated with the DNS entry, and/or the like. A network device may transmit, to the DNS server, a query that identifies the domain name to be resolved. The DNS server may search the DNS information, stored at the DNS server, to identify the DNS entry associated with the domain name. The DNS server may identify the one or more addresses associated with the domain name, and may respond to the query with the one or more addresses.

In some cases, a network device may store DNS information in a DNS memory, such as a cache memory, a memory device, and/or the like. In this way, the network device may identify an address associated with a domain name by performing a lookup in the DNS memory instead of transmitting a query to a DNS server. This may save a significant amount of networking, processing, and memory resources, as the quantity of DNS entries that are stored in the DNS memory may number in the millions.

In some cases, a DNS memory, that stores DNS information at a network device, may be a part of a control plane component of the network device. In some cases, the control plane component of the network device may experience an event that causes the network device to fail over to a backup control plane component. In this case, the network device may need to populate a DNS memory, on the backup control plane component, with DNS information in order to process traffic that is received at the network device. As indicated above, the quantity of DNS entries that may need to be populated in the DNS memory on the backup control plane may number in the millions. As a result, the network device may need to transmit millions of queries to a DNS server in a relatively short period of time, which can consume significant networking, processing, and memory resources.

Moreover, while the network device is populating the DNS information in the DNS memory on the backup control plane, the network device may be unable to process some traffic since many of the networking policies (e.g., firewall policies, routing policies, and/or the like), configured at the network device, may rely on domain name resolution in order to implement the networking policies. As a result, the network device may block traffic for new communications sessions that are established while the network device is populating the DNS information in the DNS memory on the backup control plane, may terminate existing communications sessions while the network device is populating the DNS information in the DNS memory on the backup control plane, and/or the like. This may result in a time period, on the order of minutes (e.g., 10 minutes or more), where the network device is unable to process traffic.

A similar situation may occur where the network device performs a system reset and/or another type of reset that causes a flush (and/or another type of erasure) of the DNS memory of the control plane component. In this case, the network device does not fail over to a backup control plane component, but still needs to repopulate the DNS memory of the control plane component in order to begin processing traffic using the control plane component.

Some implementations described herein provide a network device that is capable of maintaining respective DNS stores on a primary control plane component and a backup control plane component for control plane restart or failover. The network device may store DNS information in a first DNS memory on a first control plane component (e.g., a primary control plane component). The network device may back up (e.g., periodically, based on event, and/or the like) the DNS information to a DNS file and may store the DNS file in a first DNS store of the first control plane component. The network device may transfer, based on storing the DNS information in the DNS file in the first DNS store, a copy of the DNS file from the first DNS store to a second DNS store of a second control plane component included in the network device. Moreover, the network device may repopulate the first DNS memory, on the first control plane component, from the DNS file stored in the first DNS store on the first control plane component.

In this way, if an event associated with the first control plane component causes a failover from the first control plane component to the second control plane component, the network device may transfer the DNS information from the copy of the DNS file to a second DNS memory of the second control plane component. Accordingly, the network device may process traffic using the second control plane component and the DNS information stored in the second DNS memory.

Moreover, instead of failing over to the second control plane component, the network device may transfer the DNS information from the DNS file, stored in the first DNS store, to the first DNS memory of the first control plane component, and may process traffic using the first control plane component and the DNS information stored in the first DNS memory.

This reduces the quantity of queries that the network device is to send to a DNS server based on an event associated with the first control plane component, which reduces the networking, processing, and memory resources that are consumed when transmitting and processing the queries, reduces the time it takes to populate the DNS information in the second DNS memory (or repopulate the DNS information in the first DNS memory) from minutes to a few seconds, and reduces queue times and processing loads at the DNS server.

Figure 1A:
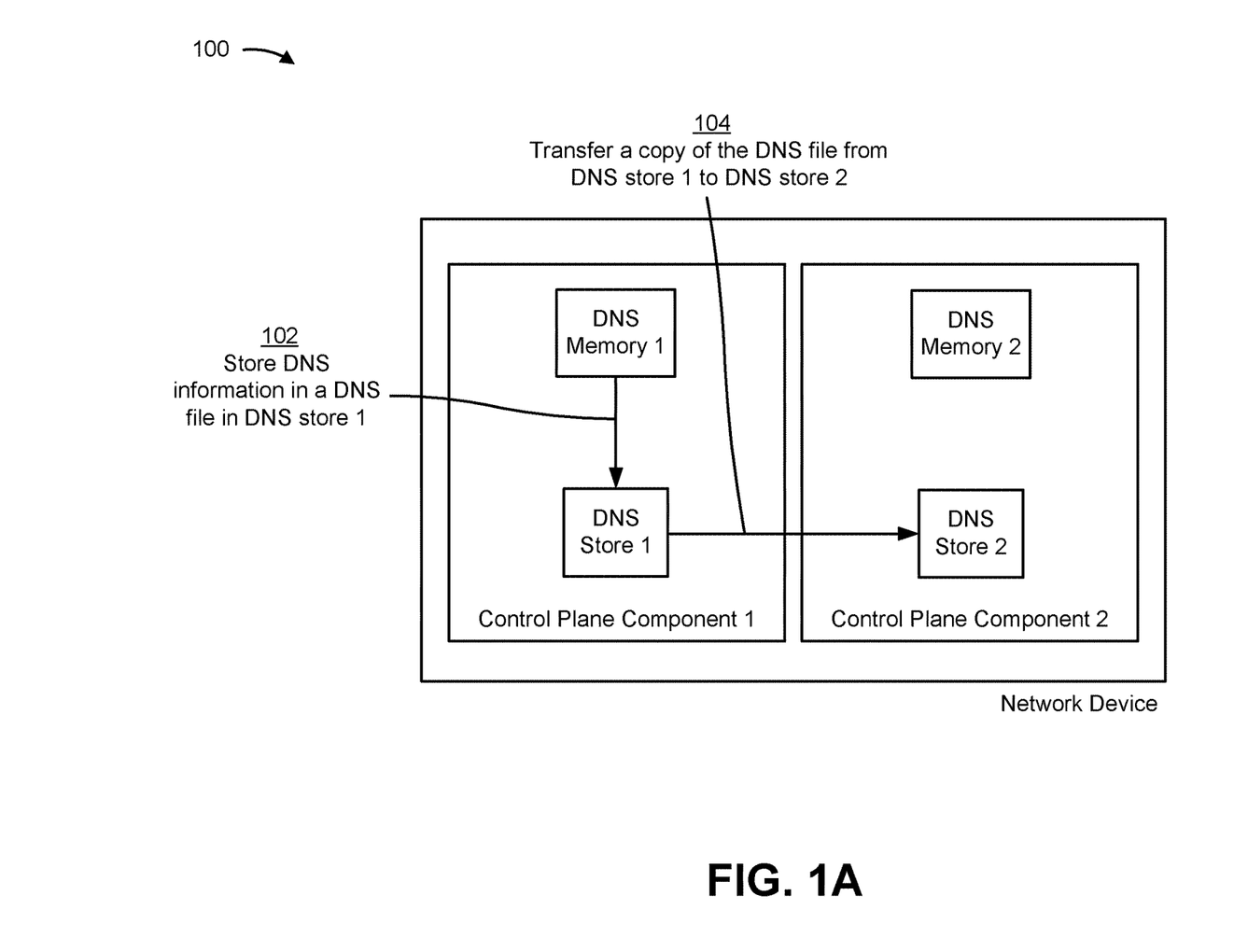
FIGS. 1A and 1B are diagrams of an example implementation described herein.
Figure 1B:
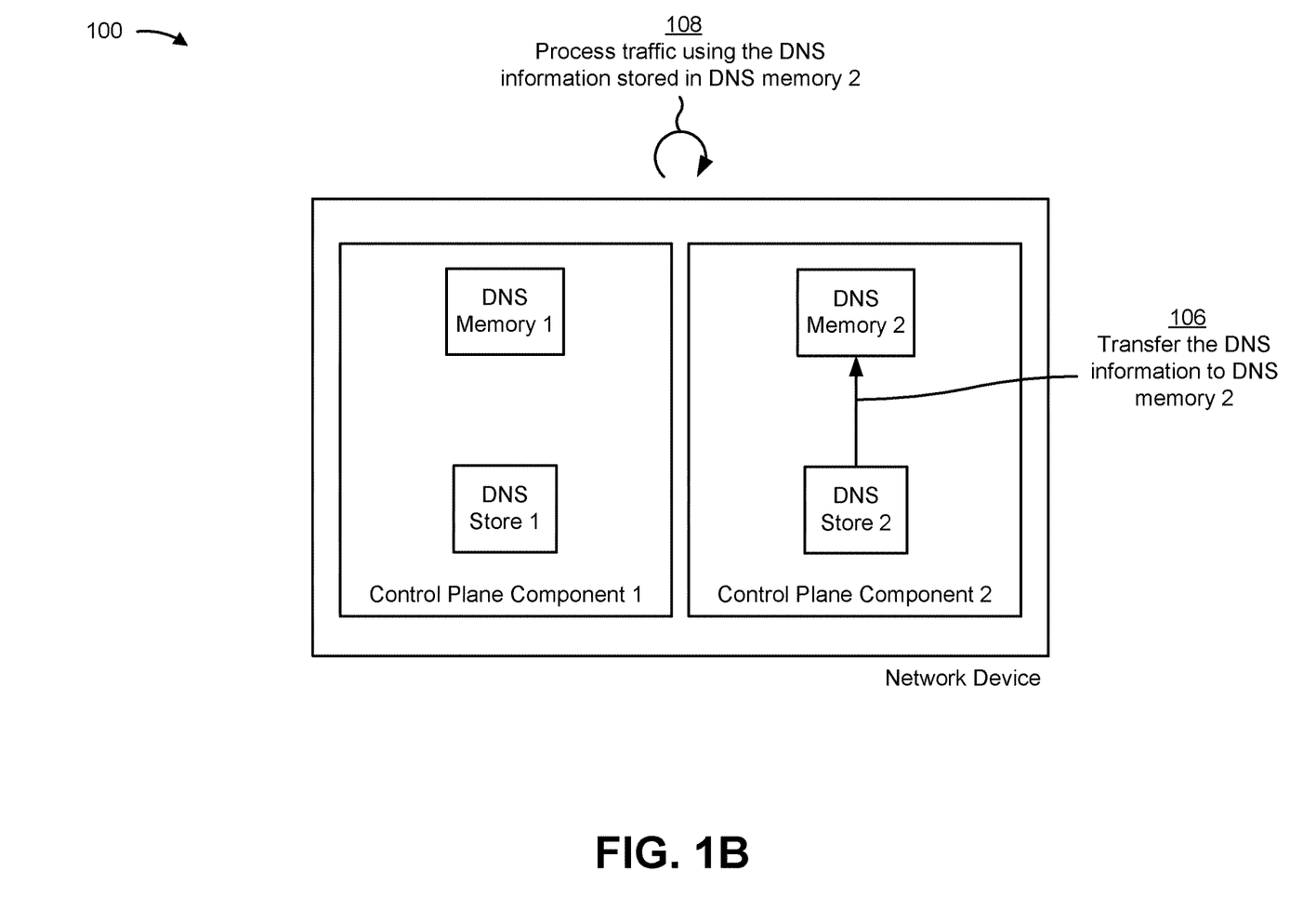

FIGS. 1A and 1B are diagrams of an example implementation 100 described herein. As shown in FIGS. 1A and 1B, example implementation 100 may include a network device. The network device may include various types of network devices, such a router, a gateway, a switch, a bridge, a wireless access point, a base station, and/or the like. The network device may be included in a network, such as a cellular network, a local area network (LAN), a core network, an access network, a wide area network (WAN) such as the Internet, a cloud network, and/or the like, along with other network devices.

The network device may process traffic that is received at the network device. The traffic may be received from another network device and/or another type of device (e.g., a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device). The network device may process the traffic that is received at the network device by applying various networking policies to the traffic and forwarding the traffic to another device.

The network policies may be configured and stored at a control plane component included in the network device. In some implementations, the network device may include a plurality of control plane components (e.g., control plane component 1, control plane component 2, and/or the like). In this case, the network device may designate one of the control plane components as a primary control plane component (e.g., control plane component 1), and another of the control plane components as a backup (or secondary) control plane component (e.g., control plane component 2). The network device may use control plane component 1 to process traffic received at the network device, and may perform a failover to control plane component 2 in order to process traffic based on event associated with control plane component 1. The event may include a control plane daemon failure or restart associated with control plane component 1, a routing daemon failure or restart associated with control plane component 1, a restart of control plane component 1, a system failure of the network device, and/or the like.

The networking policies may include one or more firewall policies, one or more security policies, one or more routing or forwarding policies, one or more quality of service (QoS) policies, and/or the like. For example, the network device may apply a networking policy that specifies that traffic from a particular source and/or transmitted to a particular destination is to be inspected using deep packet inspection. As another example, the network device may apply a networking policy that specifies that traffic from a particular source and/or transmitted to a particular destination is to be forwarded to a proxy server. As another example, the network device may apply a networking policy that specifies that traffic transmitted to a particular destination is to be blocked by the network device.

In order to apply the networking policies to traffic that is received at the network device, the network device may identify a destination of the traffic and apply the networking policies based on the destination. In some implementations, the destination may be associated with a domain name. The network device may identify the domain name by inspecting a packet included in the traffic and identifying the domain name specified in the packet. The network device may identify an address associated with the domain name, and may determine whether any networking policies are associated with the address.

In some implementations, the network device may identify the address associated with the domain name by transmitting a query to a DNS server to resolve the domain name into the address. However, in order to reduce the consumption of network, processor, and memory resources, and to reduce the amount of time it takes to identify the address, the network device may store DNS information in a DNS memory on control plane component 1 (e.g., DNS memory 1), and may identify and apply networking policies based on the DNS information stored in DNS memory 1. In some implementations, DNS memory 1 (and DNS memory 2) may include an electronic table, an electronic database, an electronic file, a cache memory, a memory device, and/or the like.

The DNS information may include information identifying a plurality of DNS entries. Each DNS entry may be associated with a domain name and may identify one or more addresses associated with the domain name. A DNS entry may also include information identifying a TTL parameter associated with the DNS entry. An address may include an IP version 4 (IPv4) address, an IP version 6 (IPv6) address, a port identifier (e.g., a port name, a port number, and/or the like), and/or the like. If the DNS information, stored in DNS store 1, does not include a DNS entry for a particular domain name, the network device may transmit a query to a DNS server for the domain name, and may receive the address information in response to the query. The network device may store the address information, in a DNS entry associated with the domain name, in DNS store 1, and may process traffic using the DNS entry stored in DNS store 1 instead of querying the DNS server.

As shown in FIG. 1A, the network device may maintain a plurality of DNS stores in order to reduce networking, processor, and memory resources in transmitting millions of queries to a DNS server when failing over to control plane component 2, and to reduce the overall time duration of processing the failover to control plane component 2. The DNS stores (e.g., DNS store 1 on control plane component 1, DNS store 2 on control plane component 2, and/or the like) may include databases, file systems, non-volatile memory devices, storage devices, and/or the like that may store DNS files as a backup of the DNS information stored in DNS memory 1. In this way, if an event occurs with control plane component 1, and the event causes a failover to control plane component 2, the network device may populate the DNS memory of control plane component 2 (e.g., DNS memory 2) from the DNS file stored in DNS store 2.

As shown by reference number 102, in order to maintain the DNS stores, the network device may store the DNS information, stored in DNS memory 1, in a DNS file. The DNS file may include an electronic file, such as an electronic database file, an extensible markup language (XML) file, a JavaScript objection notation (JSON) file, and/or another type of structured electronic file. The network device may store the DNS file in DNS store 1 on control plane component 1.

In some implementations, the network device may periodically store the DNS information from DNS memory 1 into the DNS file in DNS store 1. For example, the network device may store the DNS information in the DNS file based on a particular time interval (e.g., a one-minute time interval, a five-minute time interval, and/or the like). In some implementations, the network device may store the DNS information from DNS memory 1 into the DNS file in DNS store 1 based on detecting an event associated with the DNS information as stored in DNS memory 1. For example, the network device may detect a modification to the DNS information, such as an addition of a DNS entry to DNS memory 1, a deletion of a DNS entry from DNS memory 1, a change to a DNS entry (e.g., a change of a address associated with a domain name), and/or the like.

In some implementations, if an existing DNS file is stored in DNS store 1, the network device may store the DNS file in DNS store 1 by overwriting the existing DNS file stored in DNS store 1. In some implementations, if an existing DNS file is stored in DNS store 1, the network device may store the DNS file in DNS store 1 by modifying the existing DNS file stored in DNS store 1 based on a modification to the DNS information as stored in DNS memory 1.

As further shown in FIG. 1A, and by reference number 104, the network device may transfer a copy of the DNS file from DNS store 1 to DNS store 2 on control plane component 2. In this way, if a failover occurs, the network device may populate DNS memory 2 with the DNS information stored in the copy of the DNS file that is stored in DNS store 2.

In some implementations, the network device may periodically transfer the copy of the DNS file from DNS store 1 to DNS store 2. For example, the network device may transfer the copy of the DNS file from DNS store 1 to DNS store 2 based on a particular time interval (e.g., a one-minute time interval, a five-minute time interval, and/or the like). In some implementations, the network device may transfer the copy of the DNS file from DNS store 1 to DNS store 2 based on detecting an event associated with the DNS file as stored in DNS store 1. For example, the network device may detect that a new DNS file has been stored in DNS store 1. Accordingly, the network device may transfer the copy of the DNS file from DNS store 1 to DNS store 2 based on detecting the new DNS file being stored in DNS store 1. As another example, the network device may detect a modification to the DNS file stored in DNS store 1. The modification may include an addition of a DNS entry to the DNS file, a deletion of a DNS entry from DNS memory 1, a change to a DNS entry (e.g., a change of a address associated with a domain name), and/or the like. Accordingly, the network device may transfer the copy of the DNS file from DNS store 1 to DNS store 2 based on detecting the modification to the DNS file stored in DNS store 1.

In some implementations, if an existing copy of the DNS file is stored in DNS store 2, the network device may store the copy of the DNS file in DNS store 2 by overwriting the existing copy of the DNS file stored in DNS store 2. In some implementations, if an existing copy of the DNS file is stored in DNS store 2, the network device may store the copy of the DNS file in DNS store 2 by modifying the existing copy of the DNS file stored in DNS store 2 based on a modification to the DNS file as stored in DNS store 1.

As shown in FIG. 1B, and by reference number 106, after storing the copy of the DNS file in DNS store 2, the network device may transfer the DNS information from the copy of the DNS file, as stored in DNS store 2, to DNS memory 2. In some implementations, the network device may periodically transfer the DNS information from the copy of the DNS file to DNS memory 2. For example, the network device may transfer the DNS information from the copy of the DNS file to DNS memory 2 based on a particular time interval (e.g., a one-minute time interval, a five-minute time interval, and/or the like).

In some implementations, the network device may transfer the DNS information based on detecting an event associated with control plane component 1. The event may include an event that causes a failover from control plane component 1 to control plane component 2. For example, the event may include a control plane daemon failure or restart associated with control plane component 1, a routing daemon failure or restart associated with control plane component 1, a restart of control plane component 1, and/or the like. As another example, the event may include a system restart of the network device, in which the network device reboots in a configuration where control plane component 2 becomes the primary control plane component.

In some implementations, the network device may transfer the DNS information from the copy of the DNS file to DNS memory 2 by reading the copy of the DNS file from DNS store 2, identifying the DNS information in the copy of the DNS file based on reading the copy of the DNS file, and transferring the DNS information to DNS memory 2 based on identifying the DNS information in the copy of the DNS file.

As further shown in FIG. 1B, and by reference number 108, the network device may process traffic, received at the network device, using control plane component 2 and the DNS information stored in DNS memory 2. For example, the network device may use the DNS information, stored in DNS memory 2, to apply one or more networking policies to the traffic, to route and/or forward the traffic to one or more other devices, and/or the like.

In this way, the network device may back up the DNS information, stored in DNS memory 1, to a DNS file and may store the DNS file in DNS store 1, and may transfer a copy of the DNS file from DNS store 1 to DNS store 2. This permits the network device to populate DNS memory 2 from the copy of the DNS file stored in DNS store 2. In this way, if an event associated with control plane component 1 causes a failover to control plane component 2, the network device may transfer the DNS information from the copy of the DNS file to DNS memory 2 so that the network device may process traffic using control plane component 2 and the DNS information stored in DNS memory 2. This reduces the quantity of queries that the network device is to send to a DNS server based on an event associated with control plane component 1, which reduces the networking, processing, and memory resources that are consumed when transmitting and processing the queries, reduces the time it takes to populate the DNS information in DNS memory 2 (or repopulate the DNS information in DNS memory 1) from minutes to a few seconds, and reduces queue times and processing loads at the DNS server.

As indicated above, FIGS. 1A and 1B are provided merely as one or more examples. Other examples may differ from what is described with regard to FIGS. 1A and 1B. For example, and as indicated above, instead of processing a failover from control plane component 1 to control plane component 2 based on event associated with control plane component 1, the network device may restart control plane component 1. In this case, the network device may repopulate DNS memory 1 with the DNS information from the DNS file stored in DNS store 1 instead of transmitting millions of queries to a DNS server for the DNS information.

Figure 2:
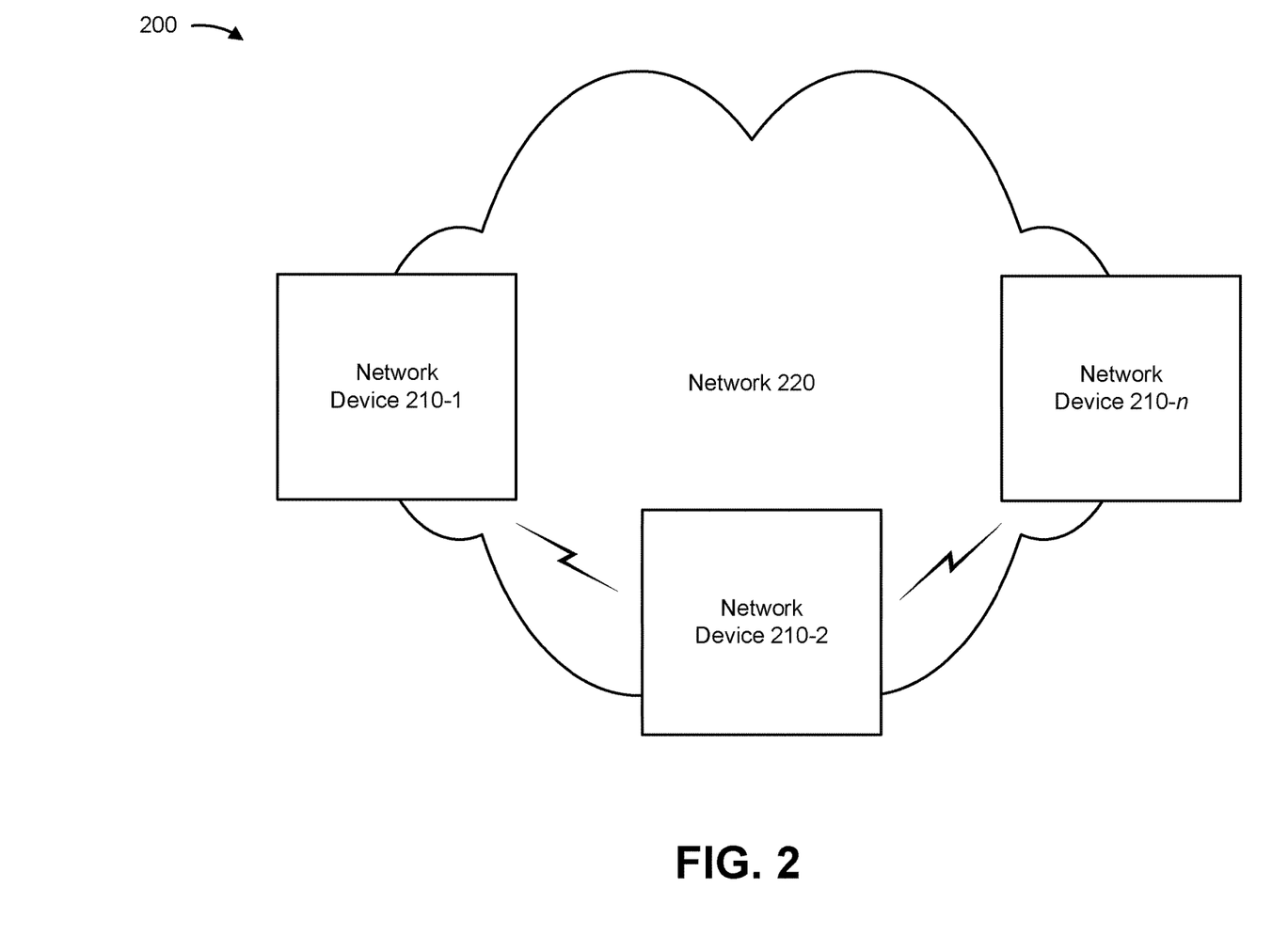
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more network devices 210-1 through 210-$n$ ($n \geq 1$) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, network device 210 may store DNS information in a DNS file in a first DNS store of a first control plane component included in network device 210. The DNS information may be associated with a plurality of DNS entries stored in a first DNS memory of the first control plane component. Network device 210 may transfer, based on storing the DNS information in the DNS file in the first DNS store, a copy of the DNS file from the first DNS store to a second DNS store of a second control plane component included in network device 210. The copy of the DNS file may include the DNS information associated with the plurality of DNS entries. Network device 210 may detect, after storing the copy of the DNS file in the second DNS store, an event associated with the first control plane component. Network device 210 may transfer, based on detecting the event, the DNS information from the copy of the DNS file to a second DNS memory of the second control plane component. Network device 210 may process, using the copy of the DNS file stored in the second DNS memory, traffic received at network device 210.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a LAN, a WAN, a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
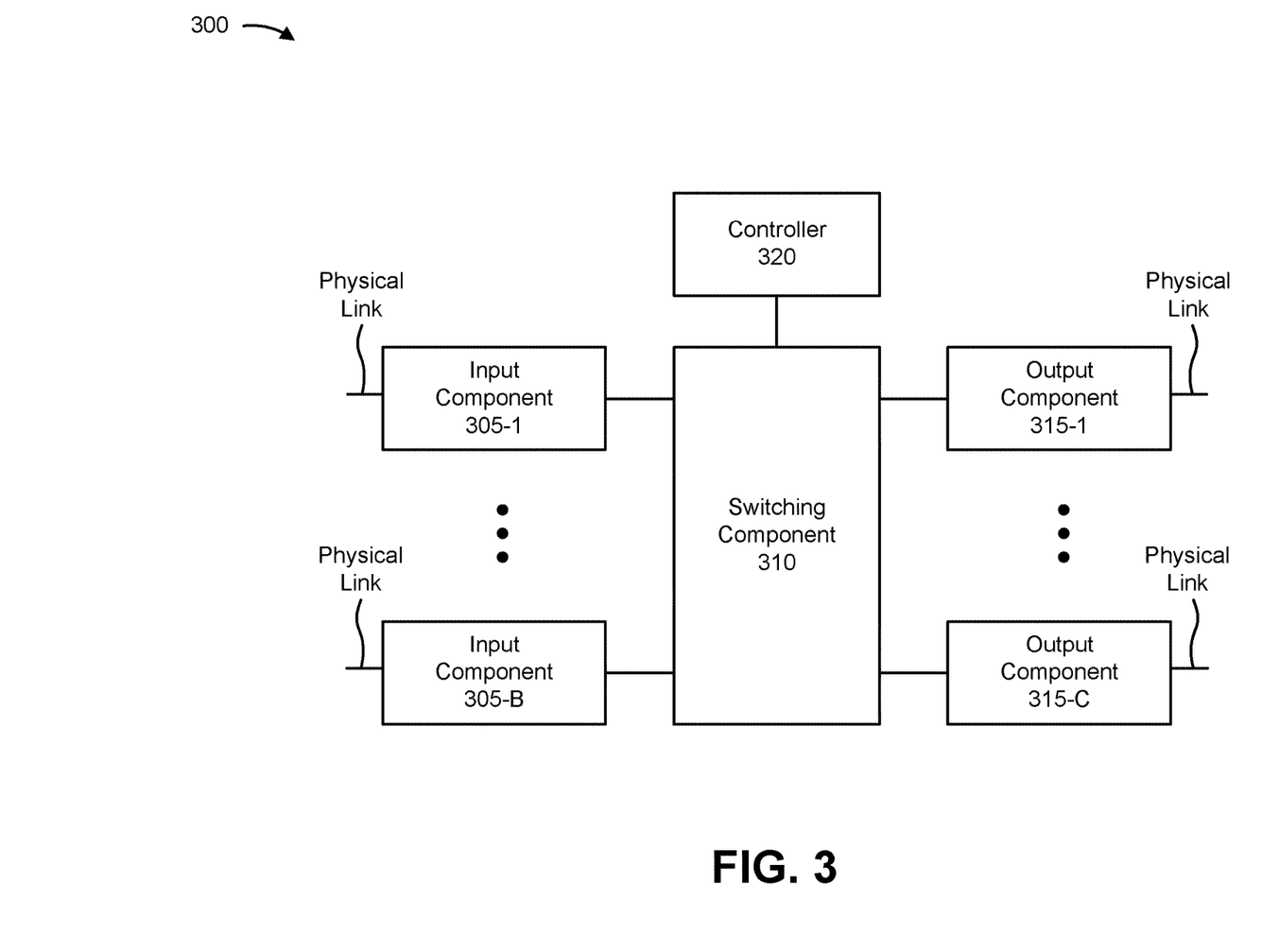
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, and/or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. As used herein, a computer-readable medium is a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
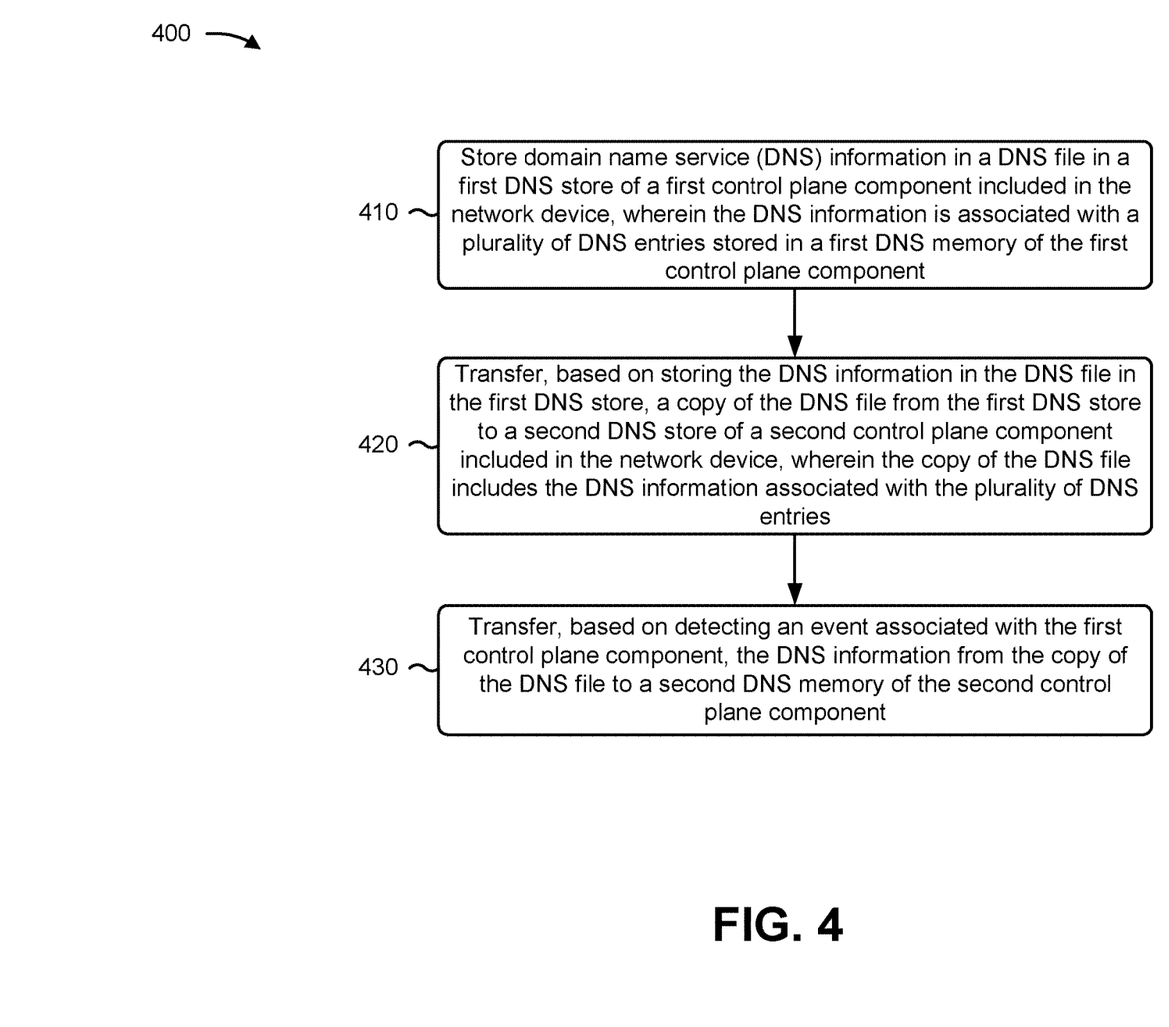
FIGS. 4-6 are flow charts of example processes for maintaining a domain name system (DNS) store for control plane restart or failover.

FIG. 4 is a flow chart of an example process 400 for maintaining a DNS store for control plane restart or failover. In some implementations, one or more process blocks of FIG. 4 may be performed by a network device (e.g., a network device 210). In some implementations, one or more process blocks of FIG. 4 may be performed by another device or a group of devices separate from or including the network device, such as another network device (e.g., another network device 210) and/or the like.

As shown in FIG. 4, process 400 may include storing DNS information in a DNS file in a first DNS store of a first control plane component included in the network device, wherein the DNS information is associated with a plurality of DNS entries stored in a first DNS memory of the first control plane component (block 410). For example, the network device (e.g., using input component 305, switching component 310, output component 315, controller 320, and/or the like) may store DNS information in a DNS file in a first DNS store of a first control plane component included in the network device, as described above. In some implementations, the DNS information is associated with a plurality of DNS entries stored in a first DNS memory of the first control plane component.

As further shown in FIG. 4, process 400 may include transferring, based on storing the DNS information in the DNS file in the first DNS store, a copy of the DNS file from the first DNS store to a second DNS store of a second control plane component included in the network device, wherein the copy of the DNS file includes the DNS information associated with the plurality of DNS entries (block 420). For example, the network device (e.g., using input component 305, switching component 310, output component 315, controller 320, and/or the like) may transfer, based on storing the DNS information in the DNS file in the first DNS store, a copy of the DNS file from the first DNS store to a second DNS store of a second control plane component included in the network device, as described above. In some implementations, the copy of the DNS file includes the DNS information associated with the plurality of DNS entries.

As further shown in FIG. 4, process 400 may include transferring, based on detecting an event associated with the first control plane component, the DNS information from the copy of the DNS file to a second DNS memory of the second control plane component (block 430). For example, the network device (e.g., using input component 305, switching component 310, output component 315, controller 320, and/or the like) may transfer, based on detecting an event associated with the first control plane component, the DNS information from the copy of the DNS file to a second DNS memory of the second control plane component, as described above.

Process 400 may include additional implementations, such as any single implementation or any combination of implementations described below and/or in connection with one or more other processes described elsewhere herein.

In some implementations, the event comprises at least one of a failure associated with the first control plane component or a control plane daemon restart associated with the first control plane component. In some implementations, transferring the DNS information from the copy of the DNS file to the second DNS memory comprises reading the copy of the DNS file from the second DNS store, identifying the DNS information in the copy of the DNS file based on reading the copy of the DNS file, and transferring the DNS information to the second DNS memory based on identifying the DNS information in the copy of the DNS file. In some implementations, the DNS information comprises respective addresses and respective TTL parameters associated with the plurality of DNS entries.

In some implementations, the respective addresses associated with the plurality of DNS entries comprise at least one of respective IPv4 addresses associated with the plurality of DNS entries or respective IPv6 addresses associated with the plurality of DNS entries. In some implementations, storing the DNS information in the DNS file in the first DNS store comprises storing the DNS information in the DNS file in the first DNS store based on detecting a modification to the DNS information as stored in the first DNS memory. In some implementations, process 400 further comprises processing traffic, received at the network device, using the DNS information stored in the second DNS memory.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
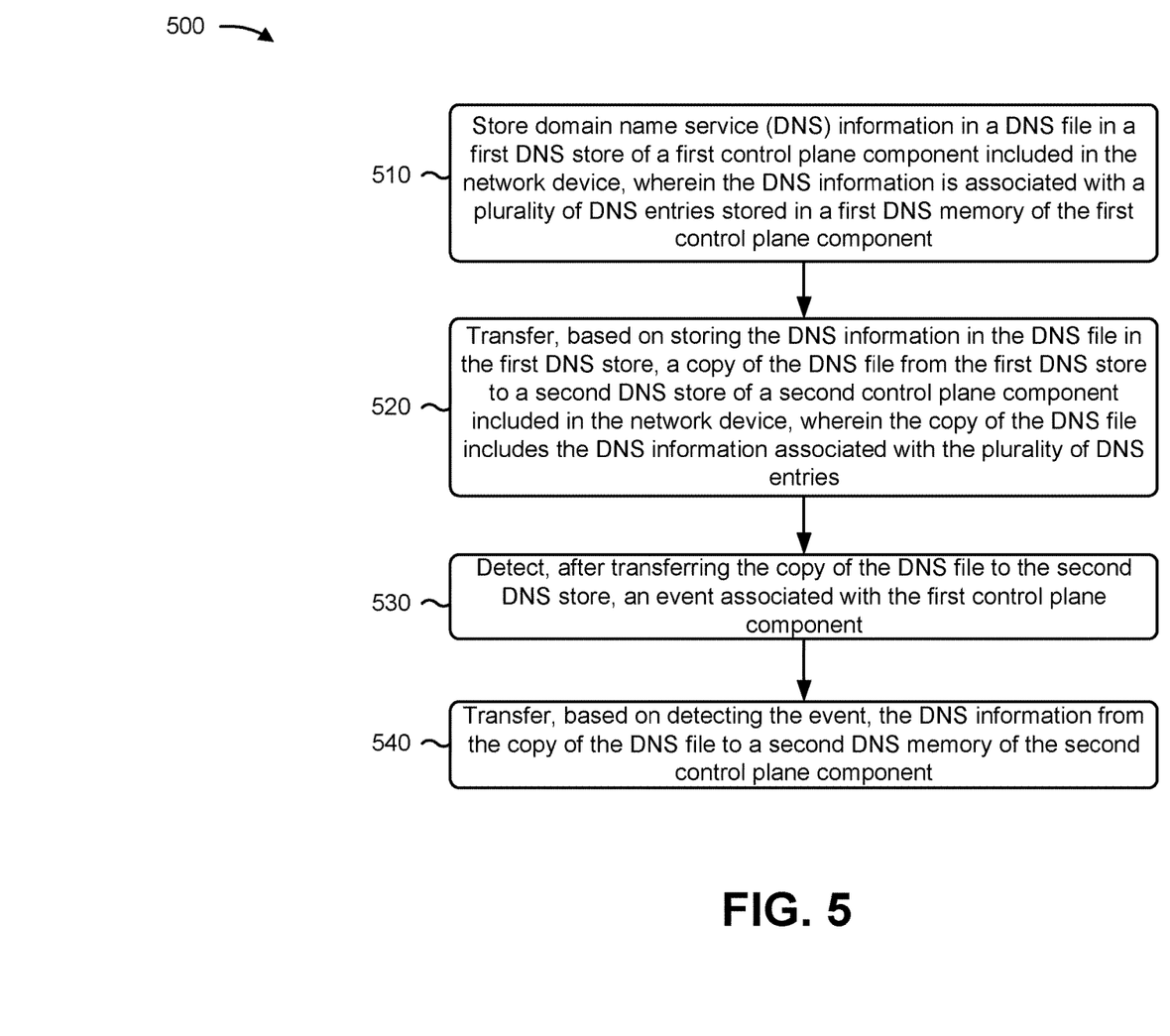

FIG. 5 is a flow chart of an example process 500 for maintaining a DNS store for control plane restart or failover. In some implementations, one or more process blocks of FIG. 5 may be performed by a network device (e.g., a network device 210). In some implementations, one or more process blocks of FIG. 5 may be performed by another device or a group of devices separate from or including the network device, such as another network device (e.g., another network device 210) and/or the like.

As shown in FIG. 5, process 500 may include storing DNS information in a DNS file in a first DNS store of a first control plane component included in the network device, wherein the DNS information is associated with a plurality of DNS entries stored in a first DNS memory of the first control plane component (block 510). For example, the network device (e.g., using input component 305, switching component 310, output component 315, controller 320, and/or the like) may store DNS information in a DNS file in a first DNS store of a first control plane component included in the network device, as described above. In some implementations, the DNS information is associated with a plurality of DNS entries stored in a first DNS memory of the first control plane component.

As further shown in FIG. 5, process 500 may include transferring, based on storing the DNS information in the DNS file in the first DNS store, a copy of the DNS file from the first DNS store to a second DNS store of a second control plane component included in the network device, wherein the copy of the DNS file includes the DNS information associated with the plurality of DNS entries (block 520). For example, the network device (e.g., using input component 305, switching component 310, output component 315, controller 320, and/or the like) may transfer, based on storing the DNS information in the DNS file in the first DNS store, a copy of the DNS file from the first DNS store to a second DNS store of a second control plane component included in the network device. In some implementations, the copy of the DNS file includes the DNS information associated with the plurality of DNS entries.

As further shown in FIG. 5, process 500 may include detecting, after transferring the copy of the DNS file to the second DNS store, an event associated with the first control plane component (block 530). For example, the network device (e.g., using input component 305, switching component 310, output component 315, controller 320, and/or the like) may detect, after transferring the copy of the DNS file to the second DNS store, an event associated with the first control plane component, as described above.

As further shown in FIG. 5, process 500 may include transferring, based on detecting the event, the DNS information from the copy of the DNS file to a second DNS memory of the second control plane component (block 540). For example, the network device (e.g., using input component 305, switching component 310, output component 315, controller 320, and/or the like) may transfer, based on detecting the event, the DNS information from the copy of the DNS file to a second DNS memory of the second control plane component, as described above.

Process 500 may include additional implementations, such as any single implementation or any combination of implementations described below and/or in connection with one or more other processes described elsewhere herein.

In some implementations, transferring the copy of the DNS file from the first DNS store to the second DNS store comprises transferring the copy of the DNS file based on detecting a change to the DNS file. In some implementations, the change to the DNS file comprises a modification to the DNS information as stored in the DNS file. In some implementations, the modification to the DNS information, as stored in the DNS file, comprises at least one of a modification to an address associated with a DNS entry of the plurality of DNS entries, a modification to a TTL parameter associated with a DNS entry of the plurality of DNS entries, an addition of a DNS entry to the plurality of DNS entries, or a deletion of a DNS entry of the plurality of DNS entries.

In some implementations, storing the DNS information in the DNS file in the first DNS store comprises detecting a modification to the DNS information as stored in the first DNS memory and storing, based on detecting the modification, the DNS information in the DNS file in the first DNS store. In some implementations, the modification to the DNS information, as stored in the first DNS memory, comprises at least one of a modification to an address associated with a DNS entry of the plurality of DNS entries, a modification to a TTL parameter associated with a DNS entry of the plurality of DNS entries, an addition of a DNS entry to the plurality of DNS entries, or a deletion of a DNS entry of the plurality of DNS entries. In some implementations, transferring the DNS information from the copy of the DNS file to the second DNS memory comprises reading the copy of the DNS file from the second DNS store, identifying the DNS information in the copy of the DNS file based on reading the copy of the DNS file, and transferring the DNS information to the second DNS memory based on identifying the DNS information in the copy of the DNS file.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
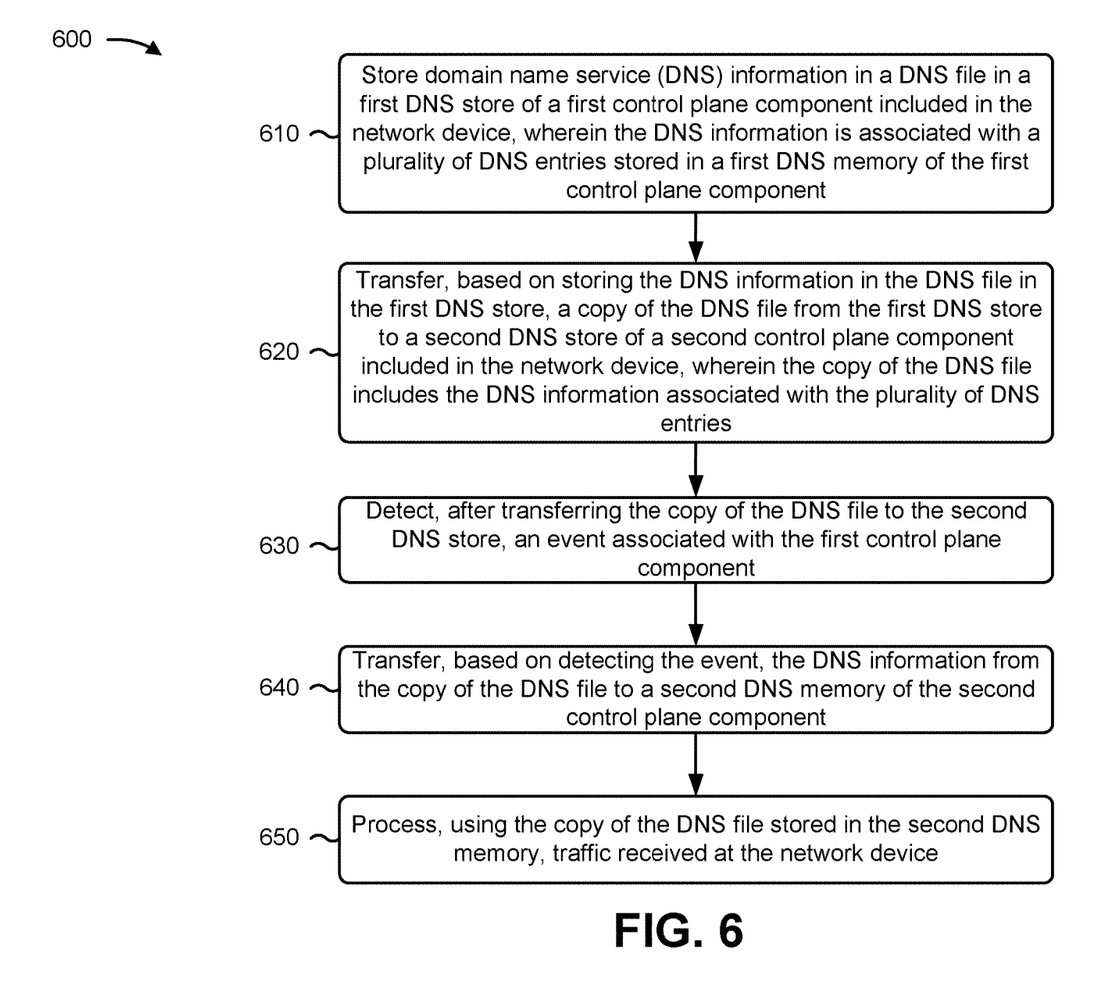

FIG. 6 is a flow chart of an example process 600 for maintaining a DNS store for control plane restart or failover. In some implementations, one or more process blocks of FIG. 6 may be performed by a network device (e.g., a network device 210). In some implementations, one or more process blocks of FIG. 6 may be performed by another device or a group of devices separate from or including the network device, such as another network device (e.g., another network device 210) and/or the like.

As shown in FIG. 6, process 600 may include storing DNS information in a DNS file in a first DNS store of a first control plane component included in the network device, wherein the DNS information is associated with a plurality of DNS entries stored in a first DNS memory of the first control plane component (block 610). For example, the network device (e.g., using input component 305, switching component 310, output component 315, controller 320, and/or the like) may store DNS information in a DNS file in a first DNS store of a first control plane component included in the network device, as described above. In some implementations, the DNS information is associated with a plurality of DNS entries stored in a first DNS memory of the first control plane component.

As further shown in FIG. 6, process 600 may include transferring, based on storing the DNS information in the DNS file in the first DNS store, a copy of the DNS file from the first DNS store to a second DNS store of a second control plane component included in the network device, wherein the copy of the DNS file includes the DNS information associated with the plurality of DNS entries (block 620). For example, the network device (e.g., using input component 305, switching component 310, output component 315, controller 320, and/or the like) may transfer, based on storing the DNS information in the DNS file in the first DNS store, a copy of the DNS file from the first DNS store to a second DNS store of a second control plane component included in the network device, as described above. In some implementations, the copy of the DNS file includes the DNS information associated with the plurality of DNS entries.

As further shown in FIG. 6, process 600 may include detecting, after transferring the copy of the DNS file to the second DNS store, an event associated with the first control plane component (block 630). For example, the network device (e.g., using input component 305, switching component 310, output component 315, controller 320, and/or the like) may detect, after transferring the copy of the DNS file to the second DNS store, an event associated with the first control plane component, as described above.

As further shown in FIG. 6, process 600 may include transferring, based on detecting the event, the DNS information from the copy of the DNS file to a second DNS memory of the second control plane component (block 640). For example, the network device (e.g., using input component 305, switching component 310, output component 315, controller 320, and/or the like) may transfer, based on detecting the event, the DNS information from the copy of the DNS file to a second DNS memory of the second control plane component, as described above.

As further shown in FIG. 6, process 600 may include processing, using the copy of the DNS file stored in the second DNS memory, traffic received at the network device (block 650). For example, the network device (e.g., using input component 305, switching component 310, output component 315, controller 320, and/or the like) may process, using the copy of the DNS file stored in the second DNS memory, traffic received at the network device, as described above.

Process 600 may include additional implementations, such as any single implementation or any combination of implementations described below and/or in connection with one or more other processes described elsewhere herein.

In some implementations, transferring the copy of the DNS file from the first DNS store to the second DNS store comprises transferring the copy of the DNS file based on detecting the DNS file being generated in the first DNS store. In some implementations, the DNS information comprises respective addresses and respective TTL parameters associated with the plurality of DNS entries, the respective addresses associated with the plurality of DNS entries comprising at least one of respective IPv4 addresses associated with the plurality of DNS entries or respective IPv6 addresses associated with the plurality of DNS entries.

In some implementations, storing the DNS information in the DNS file in the first DNS store comprises storing the DNS information in the DNS file in the first DNS store based on detecting a modification to the DNS information as stored in the first DNS memory. In some implementations, storing the copy of the DNS file in the second DNS store comprises storing the copy of the DNS file in the second DNS store based on detecting a change to the DNS file stored in the first DNS store. In some implementations, transferring the copy of the DNS file from the first DNS store to the second DNS store comprises overwriting an existing copy of the DNS file that is stored in the second DNS store.

In some implementations, the event causes a failover from the first control plane component to the second control plane component. In some implementations, the event comprises at least one of a failure associated with the first control plane component or a control plane daemon restart associated with the first control plane component.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors to:
store domain name system (DNS) information in a DNS file in a first DNS store of a first control plane component included in the network device,
wherein the DNS information is associated with a plurality of DNS entries stored in a first DNS memory of the first control plane component;
transfer, based on storing the DNS information in the DNS file in the first DNS store, a copy of the DNS file from the first DNS store to a second DNS store of a second control plane component included in the network device,
wherein the copy of the DNS file includes the DNS information associated with the plurality of DNS entries;
process traffic using the first control plane component and the DNS information stored in the first DNS memory;
detect, after transferring the copy of the DNS file to the second DNS store, an event associated with the first control plane component that causes a failover from the first control plane component to the second control plane component;
transfer, based on detecting the event associated with the first control plane component that causes the failover from the first control plane component to the second control plane component, the DNS information from the copy of the DNS file to a second DNS memory of the second control plane component; and
process traffic using the second control plane component and the DNS information stored in the second DNS memory.

2. The network device of claim 1, wherein the event comprises at least one of:
a failure associated with the first control plane component,
a restart associated with the first control plane component,
a control plane daemon restart associated with the first control plane component,
a control plane daemon failure associated with the first control plane component,
a routing daemon restart associated with the first control plane component, or
a routing daemon failure associated with the first control plane component.

3. The network device of claim 1, wherein the one or more processors, when transferring the DNS information from the copy of the DNS file to the second DNS memory, are to:
read the copy of the DNS file from the second DNS store;
identify the DNS information in the copy of the DNS file based on reading the copy of the DNS file; and
transfer the DNS information to the second DNS memory based on identifying the DNS information in the copy of the DNS file.

4. The network device of claim 1, wherein the DNS information comprises:
respective addresses and respective time to live (TTL) parameters associated with the plurality of DNS entries.

5. The network device of claim 4, wherein the respective addresses associated with the plurality of DNS entries comprise at least one of:
respective Internet protocol version 4 (IPv4) addresses associated with the plurality of DNS entries, or
respective Internet protocol version 6 (IPv6) addresses associated with the plurality of DNS entries.

6. The network device of claim 1, wherein the one or more processors, when storing the DNS information in the DNS file in the first DNS store, are to:
store the DNS information in the DNS file in the first DNS store based on detecting a modification to the DNS information as stored in the first DNS memory.

7. The network device of claim 1, wherein the one or more processors are further to:
process traffic, received at the network device, using the DNS information stored in the second DNS memory.

8. A non-transitory computer-readable medium storing instructions, the instructions comprising:
one or more instructions that, when executed by one or more processors of a network device, cause the one or more processors to:
store domain name system (DNS) information in a DNS file in a first DNS store of a first control plane component included in the network device,
wherein the DNS information is associated with a plurality of DNS entries stored in a first DNS memory of the first control plane component;
transfer, based on storing the DNS information in the DNS file in the first DNS store, a copy of the DNS file from the first DNS store to a second DNS store of a second control plane component included in the network device,
wherein the copy of the DNS file includes the DNS information associated with the plurality of DNS entries;
process traffic using the first control plane component and the DNS information stored in the first DNS memory;
detect, after transferring the copy of the DNS file to the second DNS store, an event associated with the first control plane component that causes a failover from the first control plane component to the second control plane component;
transfer, based on detecting the event that causes the failover from the first control plane component to the second control plane component, the DNS information from the copy of the DNS file to a second DNS memory of the second control plane component; and
process traffic using the second control plane component and the DNS information stored in the second DNS memory.

9. The non-transitory computer-readable medium of claim 8, wherein the one or more instructions, that cause the one or more processors to transfer the copy of the DNS file from the first DNS store to the second DNS store, cause the one or more processors to:
transfer the copy of the DNS file based on detecting a change to the DNS file.

10. The non-transitory computer-readable medium of claim 9, wherein the change to the DNS file comprises:
a modification to the DNS information as stored in the DNS file.

11. The non-transitory computer-readable medium of claim 10, wherein the modification to the DNS information, as stored in the DNS file, comprises at least one of:
a modification to an address associated with a DNS entry of the plurality of DNS entries,
a modification to a time to live (TTL) parameter associated with a DNS entry of the plurality of DNS entries,
an addition of a DNS entry to the plurality of DNS entries, or
a deletion of a DNS entry of the plurality of DNS entries.

12. The non-transitory computer-readable medium of claim 8, wherein the one or more instructions, that cause the one or more processors to store the DNS information in the DNS file in the first DNS store, cause the one or more processors to:
detect a modification to the DNS information as stored in the first DNS memory; and
store, based on detecting the modification, the DNS information in the DNS file in the first DNS store.

13. The non-transitory computer-readable medium of claim 12, wherein the modification to the DNS information, as stored in the first DNS memory, comprises at least one of:
a modification to an address associated with a DNS entry of the plurality of DNS entries,
a modification to a time to live (TTL) parameter associated with a DNS entry of the plurality of DNS entries,
an addition of a DNS entry to the plurality of DNS entries, or
a deletion of a DNS entry of the plurality of DNS entries.

14. The non-transitory computer-readable medium of claim 8, wherein the one or more instructions, that cause the one or more processors to transfer the DNS information from the copy of the DNS file to the second DNS memory, cause the one or more processors to:
read the copy of the DNS file from the second DNS store;
identify the DNS information in the copy of the DNS file based on reading the copy of the DNS file; and
transfer the DNS information to the second DNS memory based on identifying the DNS information in the copy of the DNS file.

15. A method, comprising:
storing, by a network device, domain name system (DNS) information in a DNS file in a first DNS store of a first control plane component included in the network device,
wherein the DNS information is associated with a plurality of DNS entries stored in a first DNS memory of the first control plane component;
transferring, by the network device and based on storing the DNS information in the DNS file in the first DNS store, a copy of the DNS file from the first DNS store to a second DNS store of a second control plane component included in the network device,
wherein the copy of the DNS file includes the DNS information associated with the plurality of DNS entries;
processing traffic, by the network device, using the first control plane component and the DNS information stored in the first DNS memory;
detecting, by the network device and after transferring the copy of the DNS file to the second DNS store, an event associated with the first control plane component that causes a failover from the first control plane component to the second control plane component;
transferring, by the network device and based on detecting the event, the DNS information from the copy of the DNS file to a second DNS memory of the second control plane component; and
processing, by the network device and using the copy of the DNS file stored in the second DNS memory, traffic received at the network device.

16. The method of claim 15, wherein transferring the copy of the DNS file from the first DNS store to the second DNS store comprises:
transferring the copy of the DNS file based on detecting the DNS file being generated in the first DNS store.

17. The method of claim 15, wherein the DNS information comprises:
respective addresses and respective time to live (TTL) parameters associated with the plurality of DNS entries,
wherein the respective addresses associated with the plurality of DNS entries comprise at least one of:
respective Internet protocol version 4 (IPv4) addresses associated with the plurality of DNS entries, or respective Internet protocol version 6 (IPv6) addresses associated with the plurality of DNS entries.

18. The method of claim 15, wherein storing the DNS information in the DNS file in the first DNS store comprises:
   storing the DNS information in the DNS file in the first DNS store based on detecting a modification to the DNS information as stored in the first DNS memory; and
   wherein storing the copy of the DNS file in the second DNS store comprises:
      storing the copy of the DNS file in the second DNS store based on detecting a change to the DNS file stored in the first DNS store.

19. The method of claim 18, wherein transferring the copy of the DNS file from the first DNS store to the second DNS store comprises:
   overwriting an existing copy of the DNS file that is stored in the second DNS store.

20. The method of claim 15, wherein the event comprises at least one of:
   a failure associated with the first control plane component,
   a restart associated with the first control plane component,
   a control plane daemon restart associated with the first control plane component,
   a control plane daemon failure associated with the first control plane component,
   a routing daemon restart associated with the first control plane component, or
   a routing daemon failure associated with the first control plane component.

* * * * *